March 26, 1963   A. B. JONES, JR., ET AL   3,082,629
ANTI-FRICTION SUPPORT MECHANISM
Filed Sept. 12, 1960   2 Sheets-Sheet 1

INVENTORS
ARTHUR BURTON JONES JR.
EDGAR H. LUBER
BY
ATTORNEY

March 26, 1963     A. B. JONES, JR., ET AL     3,082,629
ANTI-FRICTION SUPPORT MECHANISM Filed Sept. 12, 1960     2 Sheets-Sheet 2

INVENTORS
ARTHUR BURTON JONES JR.
EDGAR H. LUBER
BY

ATTORNEY

United States Patent Office 3,082,629
Patented Mar. 26, 1963

3,082,629
ANTI-FRICTION SUPPORT MECHANISM
Arthur Burton Jones, Jr., Newington, Conn., and Edgar H. Luber, Forest Hills, N.Y.; said Jones assignor to The Fafnir Bearing Company, New Britain, Conn., a corporation of Connecticut, and said Luber assignor to Sperry Rand Corporation, Great Neck, N.Y., a corporation of Delaware
Filed Sept. 12, 1960, Ser. No. 55,466
8 Claims. (Cl. 74—5.4)

The present invention relates to anti-friction support mechanisms for sensitive elements and particularly relates to anti-friction mechanisms or bearings for improving the accuracy of sensitive instruments such as gyroscopic instruments.

In extremely high accuracy devices, particularly gyroscopic apparatus, there is an increasing need for higher accuracy instruments necessitating improvements in anti-friction support mechanisms, particularly those of the rolling bearing type. In prior gyroscopic apparatus, the problem of drift of the gyroscope has been particularly troublesome and extensive efforts have been previously made to minimize drift, as explained more fully in U.S. patent application Serial No. 611,737, entitled, Anti-friction Support Mechanism for Gyroscopic Devices, filed September 24, 1956 and now Patent No. 2,970,480 in the names of Zeigler et al. The present invention is an improvement over the invention described in said U.S. patent application Serial No. 611,737.

The present invention is a device which materially reduces the friction moments on a sensitive element, such as the sensitive element of a gyroscopic instrument, introduced by the support or suspension of said element and other friction inducing connections between the sensitive element and its frame, such as slip rings. For purposes of example, the present invention will be described in terms of a modified thrust ball bearing. When a ball bearing is loaded in thrust (a condition which exists, for instance, when the axis of the bearing supporting the sensitive element is vertical or when a preload is applied to the bearing) the friction moments on the sensitive element introduced by forces established between the bearing balls and the inner race (which is integral with the sensitive element) are quite high. In the case of a gyroscopic instrument, for instance, these friction moments prevent the instrument from achieving the accuracy required in modern inertial guidance systems.

To reduce the effects of the aforementioned friction moments, the invention described in the above-mentioned U.S. patent application Serial No. 611,737 utilizes a compound bearing which averages the friction torques by rotating an intermediate race through several revolutions first in one direction and then in the opposite direction. However, when thrust loading as described above is used, the torque created by rotating the bearing in one direction is relatively high and the torque created by rotating it in the opposite direction may not be exactly equal to the first torque. This causes the average of these torques to be high and varying with time, i.e., random.

One purpose of the present invention is to provide a device which materially reduces to the point of substantially eliminating the aforementioned undesirable friction moments by applying a force on the sensitive element where the bearing balls contact the inner race which (a) cancels the friction forces acting thereupon and (b) by acting as a moment around the vertical axis or center line of the sensitive element cancels or materially reduces all other friction moments acting thereupon. This is accomplished in the present invention by means which applies a force on the bearing balls of the bearing having a magnitude and a direction which is transmitted to the sensitive element to substantially eliminate the undesirable torque about the output axis of the sensitive element. In a preferred embodiment of the invention, means are provided for applying the force to the bearing balls by means of the bearing ball retainer.

It is a primary object of the present invention to provide an improved anti-friction support mechanism for sensitive elements.

It is an additional object of the present invention to provide anti-friction support mechanism for gyroscopic instruments which materially improves the accuracy of gyroscopic instruments.

It is a further object of the present invention to provide an anti-friction support mechanism for sensitive elements which includes means for substantially counteracting undesirable errors due to friction within the support mechanism and due to causes external thereto.

These and other objects of the invention will become apparent from the following description of the drawings wherein.

While the present invention will be described as applied to certain configurations of rolling bearing means in a gyroscope it is to be understood that this invention is applicable not only to all types of rolling bearing means but is also adaptable to appreciably reducing friction in devices other than in gyroscopes.

Figures 1, 5:
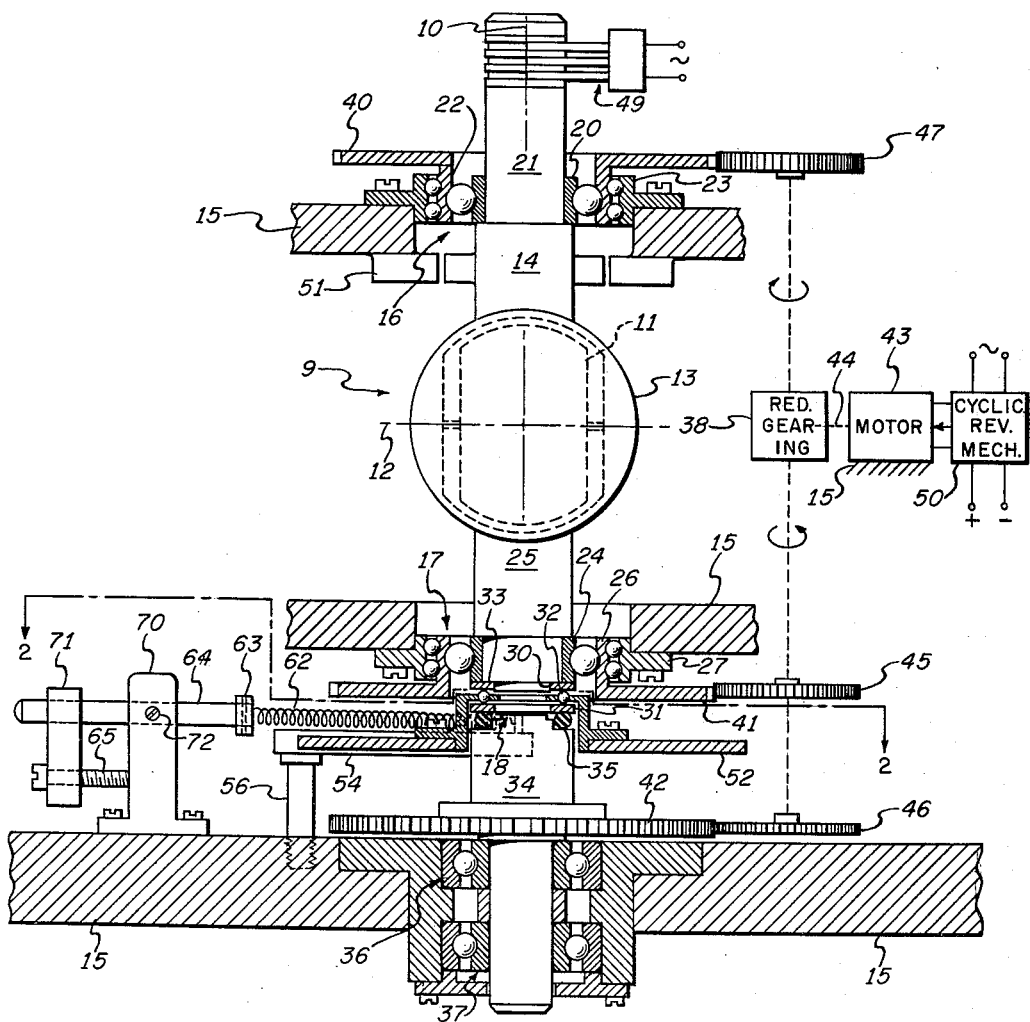
FIG. 1 is a longitudinal section of a single-degree-of-freedom gyroscope having a thrust bearing embodying the present invention with parts of the drawing in elevation.
FIG. 5 is an enlarged longitudinal section of the retainer 86 of FIG. 3.

Referring now to FIG. 1, a preferred embodiment of the invention will be described with respect to a single degree of freedom gyroscope 9 which is rotatably supported to provide an output about its output or vertical axis 10. The gyroscope 9 has its gyroscopic rotor 11, shown in dotted lines, mounted within a housing 13 for spinning about a horizontal axis 12 that is perpendicular to the vertical axis 10. The housing 13 is connected to a vertical gimbal 14. The gyroscope 9 by means of its vertical gimbal 14 is journalled for rotation about its vertical axis 10 within a frame 15 by means of spaced compound radial bearings 16 and 17 and a thrust bearing 18. The radial bearings 16 and 17 restrain the gyroscope 9 against radial shift while its weight is supported by the thrust bearing 18. The compound radial bearings 16 and 17 are aligned coaxially with respect to the vertical axis 10 and are of the type more fully disclosed in the aforementioned U.S. patent application Serial No. 611,737.

The radial bearing 16 has an inner race 20 integral with the upper trunnion 21 of the gimbal 14, an intermediate race 22 and an outer race 23, the latter being mounted on the frame 15. Bearing balls are disposed between the races 20 and 22 as well as between the races 22 and 23. Similarly, the radial bearing 17 has an inner race 24 integral with the lower trunnion 25 of the gimbal 14, an intermediate race 26 and an outer race 27, the latter being mounted on the frame 15. Bearing balls are disposed between the races 24 and 26 as well as between the races 26 and 27.

The thrust bearing 18 has an upper thrust plate 30 which acts as an inner race, a lower thrust plate 31 which acts as an outer race, bearing balls 32 disposed between the plates 30 and 31, and a ball retainer 33. The upper thrust plate 30 is integral with the lower extremity of the vertical gimbal 14 for supporting the gyroscope 9. The lower thrust plate 31 is mounted on a rotatable lower thrust plate support 34 preferably by means of an O-ring 35. The support 34 is mounted for rotation about the vertical axis 10 by means of spaced bearings 36 and 37 which are mounted on the frame 15.

To reduce the drift of the gyroscope, the friction torques are averaged as fully explained in the aforementioned patent application Serial No. 611,737 by rotating the intermediate races 22 and 26 of the radial bearings 16 and 17 and the lower thrust plate 31 of the thrust bearing 18 through several revolutions first in one direction and then in the opposite direction with the intermediate races 22 and 26 being rotated in opposite directions with respect to each other. To accomplish this the intermediate race 22 has an extension thereof to which a spur gear 40 is attached and the intermediate race 26 has an extension thereof to which the spur gear 41 is attached. Similarly, a spur gear 42 is attached to an extension of the support 34. The gears 41 and 42 are rotated in the same direction by means of a motor 43 which has its output shaft 44 connected through reduction gearing 38 to drive the gears 41 and 42 by means of spur gears 45 and 46 respectively while the gear 40 is rotated in the opposite direction with respect to the gears 41 and 42 by a spur gear 47. The direction of rotation of the motor 43 is cyclically reversed after the races 22, 26 and 31 have completed several revolutions in one direction by means of a cyclic reversing mechanism 50.

As explained above, with thrust loading as described, the torque created by rotating in one direction is relatively high and may not be exactly equal to the torque created when rotating in the opposite direction. Further, the friction caused by electrical connections, for example slip ring connections 49 required to transmit power to spin the gyroscopic rotor 11, create friction torques that act to provide an erroneous output about the vertical axis 10.

The undesirable torques appearing around the vertical axis 10 which cause an error in the output signal from an output pick-off 51 can be substantially eliminated by applying countertorques to the vertical gimbal 14 around the vertical axis 10. By introducing a slight drag on the retainer 33 of the thrust bearing 18 while its lower thrust plate 31 is being rotated, countertorques can be induced which substantially cancel the undesirable friction torques about the vertical axis 10. Due to the drag of the retainer 33 on the balls 32 of the thrust bearing 18 forces are introduced at the places where the balls 32 contact the upper thrust plate 30 which counteract the force of rolling friction normally acting at these places of contact. The forces can be adjusted so that the undesirable torque about the output or vertical axis 10 of the gyroscope 9 is reduced to substantially zero.

Figure 2:
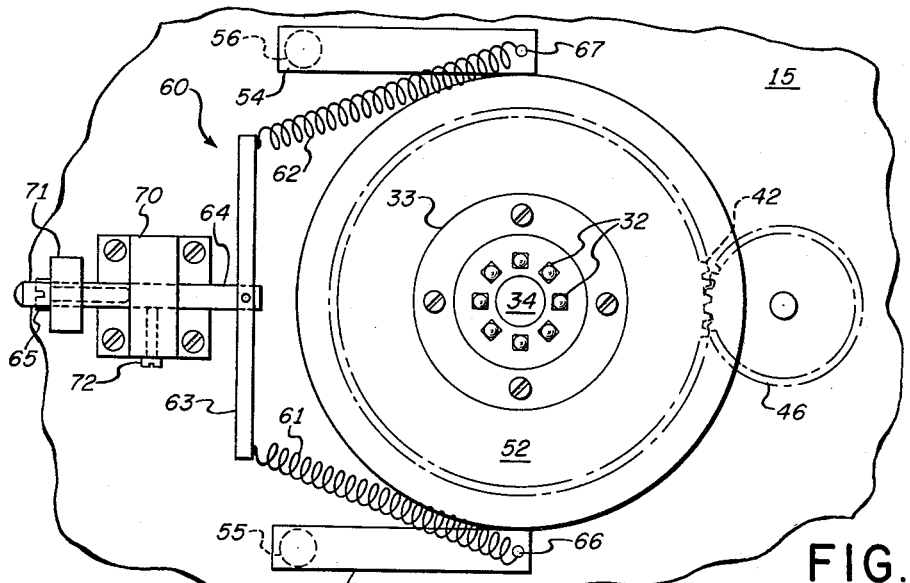
FIG. 2 is a section taken along lines 2—2 of FIG. 1.

One means for applying a drag on the retainer 33 of the thrust bearing 18 is shown in FIGS. 1 and 2 where a drag disc 52 is coaxially and rigidly connected by being screwed, for example, to the retainer 33. A drag or force is exerted on the drag disc 52 by means of brake shoes 53 and 54 which are pivotally mounted on the frame 15 by means of pivots 55 and 56 respectively. The brake shoes 53 and 54 are disposed to bear against the periphery of the drag disc 52 at points on its periphery that are diametrically opposed as shown clearly in FIG. 2. The force applied by the brake shoes 53 and 54 to the drag disc 52 is adjustable by a force adjusting mechanism 60.

The force adjusting mechanism 60 includes helical springs 61 and 62, a yoke 63, an adjusting rod 64 and a fine adjustment screw 65. The spring 61 has one extremity connected to a pin 66 that is mounted on the brake shoe 53 in spaced relation to its pivot 55. The other extremity of the spring 61 is connected to an extremity of the yoke 63. Similarly, spring 62 has one extremity connected to a pin 67 that is mounted on the brake shoe 54 in spaced relation to its pivot 56 with its other extremity connected to an extremity of the yoke 63. The center of the yoke 63 is pivotally connected to the adjusting rod 64 which in turn is slideably disposed in a projection 70 of the frame 15. Moving the adjusting rod 64 toward or away from the drag disc 52, as viewed in FIG. 2, reduces or increases the tension in the springs 61 and 62 thereby reducing or increasing respectively the resilient forces applied by the brake shoes 53 and 54 to the drag disc 52. A vernier adjustment of the position of the adjusting rod 64 is obtained by the fine adjustment screw 65 which is threadedly disposed in a guide 71 which in turn is rigidly connected to the adjusting rod 64. An extremity of the adjusting screw 65 bears against the projection 70. A set screw 72 secures the adjusting rod 64 to the projection 70 when the ultimate position of the rod 64 is determined.

In operation, the gyroscope 9 remains substantially stationary while the frame 15 rotates with respect to it about the vertical axis 10 to provide an output signal from the pick-off 51. Although the friction due to the bearings 16, 17 and 18 is greatly reduced by rotation of the intermediate races 22, 26 and the lower race 31 respectively, as explained above, and as explained more fully in said patent application Serial No. 611,737 there are still some friction forces remaining which result in undesirable drift of the gyroscope 9 thereby causing an undesirable output from the pick-off 51. The friction moments acting on the gyroscope 9 includes (a) the moment introduced by the friction force at the contact area of each of the balls 32 acting on the upper thrust plate 30 which in turn acts upon the gyroscope 9 through a moment arm equal to the distance between the center of the contact area of each of the balls 32 and the vertical axis 10 of the gyroscope 9, (b) the friction moment introduced by each of the balls 32 sliding at their respective contact areas with the upper thrust plate 30 about an axis joining the center of the contact area and the centers of the respective balls 32, and (c) the friction moment introduced by external connections from the gyroscope 9 to the frame 15, for example the friction due to the electrical slip rings. The rotation of the support 34 causes the lower thrust plate 31 to rotate with it which in turn results in rotation of the retainer 33, and the drag disc 52.

The adjusting rod 64 is positioned in order that the drag force applied by the brake shoes 53 and 54 to the drag disc 52 has a magnitude and a direction that results in the substantial cancellation of the net friction moments described above. The force applied by the brake shoes 53 and 54 due to the tension of springs 61 and 63 to the drag disc 52 is in turn applied to the retainer 33 to slow down the normal rotation of the retainer 33. Slowing down the speed of rotation of the retainer 33 causes it to apply a force to the balls 32 having a magnitude and a direction to substantially cancel out the net friction moments acting about the vertical axis 10 by causing the balls 32 to apply an equal countertorque to the upper thrust plate 30 which is integral with the vertical gimbal 14 of the gyroscope 9. This countertorque substantially eliminates the undesirable moments about the vertical axis 10 thereby substantially eliminating the drift error in the output signal from the pick-off 51.

Figure 3:
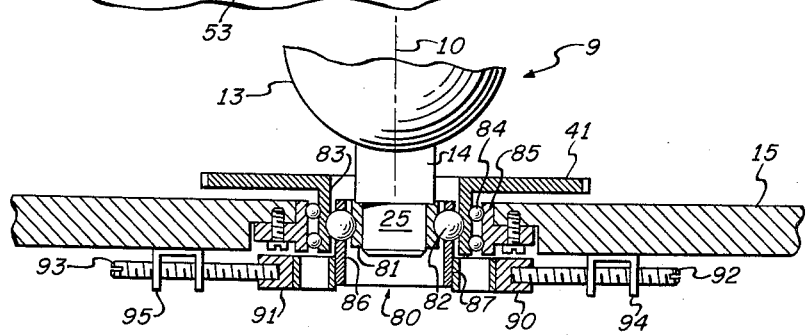
FIG. 3 is a longitudinal section of the lower portion of the single-degree-of-freedom gyroscope of FIG. 1 having an angular contact bearing embodying the present invention.

By referring to FIGS. 3 and 4, the present invention will now be described with respect to an angular contact bearing 80 supporting a gyroscope 9 of the type described with respect to FIG. 1 wherein like elements will be indicated by like reference characters. The angular contact bearing 80 comprises an inner race 81, an inner row of bearing balls 82, an intermediate race 83, a double outer row of bearing balls 84, an outer race 85, and a ball retainer 86 separating the balls 82. The inner race 81 is integral with the lower trunnion 25 of the vertical gimbal 14 of the gyroscope 9. In order to provide a drag force on the retainer 86, the retainer 86 has an extension 87 that is cooperative with brake shoes 90 and 91.

Figure 4:
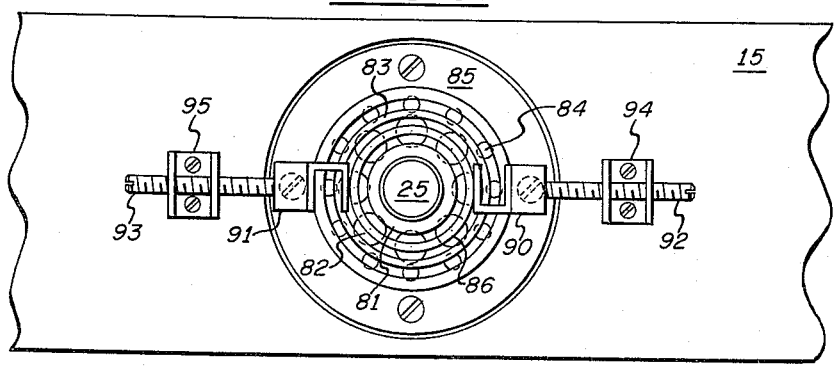
FIG. 4 is a bottom view of FIG. 3.

As shown more clearly in FIG. 4, the brake shoes 90 and 91 contact the periphery of the extension 87 of the retainer 86 at diametrically opposite points. The force applied by the brake shoes 90 and 91 is adjustable by means of adjusting screws 92 and 93 respectively. The adjusting screws 92 and 93 are mounted within threaded guides 94 and 95 respectively which in turn are mounted on the frame 15. A spur gear 41 is connected to an extension of the intermediate race 83 in a manner similar to that described above with respect to intermediate race 26 shown in FIG. 1.

Preferably, as shown in FIG. 5, the retainer 86 has canted holes 96 which receive the balls 82 and prevent the retainer 86 from contacting either the inner race 81 or the intermediate race 83 during operation.

In operation, the intermediate race 83 is rotated in a manner similar to that described with respect to the intermediate race 26 of FIG. 1. The rotation of the intermediate race 83 causes the retainer 86 to rotate with the race 83. By adjusting the adjusting screws 92 and 93, the brake shoes 90 and 91 respectively are adjusted to provide a drag force against the retainer 86 tending to slow it down. A fraction of this force is transmitted to each of the balls 82 and thus to the inner race 81. By suitable adjustment of the force applied by the brake shoes 90 and 91, the drag on the retainer 86 can be adjusted to substantially eliminate the net friction moments about the vertical axis 10 in a manner similar to that described with respect to the thrust bearing 18 of FIG. 1. Periodically reversing the direction of rotation of the intermediate race 83 reduces any small remaining random moments to the point where they are negligible.

While the invention has been described with respect to a mechanical means for applying a force to a ball retainer 33 in order to substantially eliminate undesirable friction moments around the vertical axis 10 of a sensitive element, i.e., gyroscope 9, it will be understood that the force or drag may be applied to the retainer 33 by other means including (1) an eddy current brake, (2) an electromagnetic device, (3) a permanent magnetism arrangement, (4) a fluid device or (5) supporting the retainer on a bearing. Further, it will be appreciated that the force may be applied directly to the bearing balls associated with the inner race, i.e., balls 32 and 82 by means of magnetism or by a drag applied directly to the bearing balls.

During accelerations, the normal forces at the contact areas of the balls will change because the weight of the instrument changes. This will cause a change in the friction forces, and possibility a change in the friction moments acting on the instrument. To compensate for this, the following acceleration sensitive effects may be made use of: (1) The retainer mass will itself exert a force on the balls as a function of acceleration. (2) Under accelerations, relative displacement will occur between the bearing balls (and the retainer) and the means for applying the drag. This displacement may be made use of in all embodiments mentioned in the preceding paragraph. (3) If fluids or gases are used, (a) the flow of fluid may be metered as a function of acceleration, (b) the gap between the retainer and the stationary element may be varied, thereby varying the shear force. (4) The point of application of the force providing the drag may be varied, thereby varying the drag torque on the retainer. (5) If an electromagnetic device is used, the current may be made a function of the acceleration.

The undesirable friction moment described above tends to vary with the attitude of the gimbal thus by varying the drag on the retainer as a function of the gimbal's attitude substantially zero friction is theoretically possible at all times.

While the invention has been described with respect to applying sufficient force to counteract the undesirable friction torques around the vertical axis 10 of the gyroscope 9, the present invention may also be utilized to apply more than enough force to overcome the undesired friction torques. In this way the present invention may be utilized to torque the gyroscope in lieu of a conventional electrical gyroscopic torquing device. Preferably, when the invention is applied as a torquing device the outer race, for example, the lower thrust plate 31 of the thrust bearing 18 would be rotated unidirectionally and would not have its direction of rotation periodically reversed as described above.

Although the invention has been described with respect to thrust and angular contact bearings, it is obvious that it is equally adaptable to radial bearings.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination, a sensitive element, means responsive to the movement of said sensitive element for providing an output signal in accordance therewith, bearing means supporting said element for rotation about an axis thereof, said bearing means including an inner race, an outer race and rolling anti-friction members between said races, means including said bearing means tending to apply an undesirable torque to said sensitive element tending to cause an undesirable output signal, and means for applying a force to said rolling anti-friction members in a direction and of a magnitude to effectively substantially eliminate said undesirable torque.

2. In combination, a sensitive element, means responsive to the movement of said sensitive element for providing an output signal in accordance therewith, bearing means rotatably supporting said element, said bearing means including an inner race, an outer race, rolling anti-friction members disposed between said races and retainer means cooperative with and separating said rolling anti-friction members, at least said bearing means tending to apply an undesirable torque to said sensitive element tending to cause an undesirable output signal, and means for applying a force to said retainer means in a direction and of a magnitude to effectively substantially eliminate said undesirable torque.

3. In combination, a sensitive element having an output axis, bearing means supporting said element for rotation about its output axis, said bearing means including an inner race, an outer race, rolling anti-friction members disposed between said races, and retainer means cooperative with said separating said rolling anti-friction members, said outer race being rotatable and when rotating said bearing means tends to apply an undesirable torque about said output axis, and means for applying a force to said retainer means in a direction and of a magnitude to effectively substantially eliminate said undesirable torque about said output axis.

4. In a gyroscopic device, a sensitive element having a vertical output axis, means including thrust bearing means supporting said element for rotation about its vertical output axis, said thrust bearing means including an inner race, an outer race, balls disposed between said races, and a ball retainer cooperative with and separating said balls, said outer race being rotatable and when rotating said balls tends to apply an undesirable torque about said output axis, and means for applying a force to said retainer having a magnitude and a direction to effectively substantially eliminate said undesirable torque about said output axis.

5. In a gyroscopic device, a sensitive element having a vertical output axis, means including thrust bearing means supporting said element for rotation about its vertical output axis, said thrust bearing means including an inner race, an outer race, balls disposed between said races, and a ball retainer cooperative with and separating said balls, said outer race being rotatable and when rotating said balls tend to apply an undesirable torque about said output axis, means cooperative with said sensitive element tending to apply an additional undesirable torque about said output axis, and means for applying a force to said retainer having a magnitude and a direction to effectively substantially counteract the net undesirable torque about said output axis.

6. In combination, a pair of aligned spaced radial bearings, a loaded shaft rotatably restrained in said bearings for rotation about a normally vertical axis, said bearings including an intermediate element disposed in cooperative relative rotatable relationship between inner and outer anti-friction elements, thrust bearing means supporting said shaft for rotation about said vertical axis, said thrust bearing means including an inner race, an outer race, balls disposed between said races and a ball retainer cooperative with and separating said balls, said intermediate elements of said radial bearings, and said outer race of said thrust bearing being rotatable and when rotating said balls tend to apply an undesirable torque about said vertical axis, means for continuously rotating and periodically reversing the directions of rotation of both intermediate elements simultaneously in opposite directions and said outer race of said thrust bearing means, and means for applying a force to said ball retainer having a magnitude and a direction to effectively substantially eliminate said undesirable torque about said vertical axis.

7. In combination, an element, bearing means for rotatably supporting said element for rotation about an axis thereof, means tending to apply an undesirable torque to said element about said axis, said bearing means including anti-friction means cooperative with said element, and means for applying a force to said anti-friction means in a direction and of a magnitude to effectively substantially eliminate said undesirable torque about said axis.

8. In combination, an element, bearing means for rotatably supporting said element for rotation about an axis thereof, means including said bearing means tending to apply an undesirable torque to said element about said axis, said bearing means including rolling anti-friction means cooperative with said element, and means for applying a force to at least a portion of said rolling anti-friction means in a direction and of a magnitude to effectively substantially eliminate said undesirable torque about said axis.

References Cited in the file of this patent
UNITED STATES PATENTS

| | | |
|---|---|---|
| 2,048,834 | Young | July 28, 1936 |
| 2,209,735 | Lauck | July 30, 1940 |
| 2,577,942 | Agins | Dec. 11, 1951 |
| 2,662,410 | Ballard et al. | Dec. 15, 1953 |